US005564068A

United States Patent [19]
Nguyen

[11] Patent Number: 5,564,068
[45] Date of Patent: Oct. 8, 1996

[54] HOME LOCATION REGISTER FOR MANUAL VISITORS IN A TELECOMMUNICATION SYSTEM

[75] Inventor: Viet A. Nguyen, Montreal, Canada

[73] Assignee: Telefonaktiebolaget LM Ericsson, Stockholm, Sweden

[21] Appl. No.: 330,982

[22] Filed: Oct. 28, 1994

[51] Int. Cl.⁶ .................................................. H04Q 7/00
[52] U.S. Cl. .................. 455/33.1; 455/33.2; 379/60; 379/59
[58] Field of Search .................. 455/33.1, 33.2, 455/33.4, 53.1, 54.1, 54.2, 56.1, 67.1; 379/59, 60

[56] References Cited

U.S. PATENT DOCUMENTS

| | | | |
|---|---|---|---|
| 4,901,340 | 2/1990 | Parker et al. | 379/60 |
| 5,123,111 | 6/1992 | Delory et al. | 455/34.1 |
| 5,142,654 | 8/1992 | Sonberg et al. | 379/60 |
| 5,210,787 | 5/1993 | Hayes et al. | 379/60 |
| 5,260,987 | 11/1993 | Mauger | 379/58 |
| 5,289,179 | 2/1994 | Beeson, Jr. et al. | 340/826 |
| 5,301,234 | 4/1994 | Mazziotto et al. | 380/23 |
| 5,307,400 | 4/1994 | Sawyer et al. | 379/59 |

FOREIGN PATENT DOCUMENTS

0037069A3  3/1981  European Pat. Off..
WO92/13416 8/1992  WIPO.

OTHER PUBLICATIONS

Keith W. Kaczmaerek, *Cellular Networking: A Carrier's Perspective*, May 1989, pp. 1–6.
Hans Lindqvist, *The Future of Roaming Services and Cellular Networking*, 1987, pp. 923–926.

Primary Examiner—Reinhard J. Eisenzopf
Assistant Examiner—Doris To
Attorney, Agent, or Firm—Smith & Catlett, P.C.

[57] ABSTRACT

A manual home location register (M-HLR) for use in a cellular telecommunication system provides manual visitors in a visited network with the same registration capabilities as automatic visitors from networks that have automatic roaming agreements with the visited network. The M-HLR maintains a database of manual visitor information separate from the network's database of home subscribers and automatic visitors. Initial registration in the visited network by a manual visitor is recorded in the M-HLR and enables the manual visitor to roam freely between multiple mobile switching centers (MSCs) in the visited network without having to re-register in each MSC.

12 Claims, 5 Drawing Sheets

HOME LOCATION REGISTER FOR MANUAL VISITORS IN A TELECOMMUNICATION SYSTEM

BACKGROUND OF THE INVENTION

1. Technical Field of the Invention

This invention relates to cellular telephone networks, and more particularly, to foreign network registration of roaming cellular telephones.

2. Description of Related Art

In existing cellular telecommunication systems, when a subscriber leaves a home network and enters a visited network that does not have automatic roamer signaling with the subscriber's home network, that subscriber cannot originate calls until the subscriber is manually registered. With or without an operator's manual intervention, the roaming subscriber must be connected as a manual visitor with a validation against a clearinghouse or validation of a credit card. In addition, within the visited network, every time the subscriber roams from one mobile switching center (MSC) to another visited MSC, the subscriber must go through the same procedure to re-register as a manual roamer.

In some networks, the manual registration procedure must be repeated every time the subscriber originates a call. Additionally, in order to minimize fraudulent calls, no call delivery is provided to manual subscribers because subscriber records are kept only for the duration of each call.

SUMMARY OF THE INVENTION

In a cellular telecommunication system in which mobile subscribers may roam from a home network to a visited network having an automatic roaming agreement with the home network, and to a visited network without an automatic roaming agreement with the home network, the present invention provides visiting subscribers to a visited network without an automatic roaming agreement with the subscriber's home network with the same registration capabilities as visiting subscribers to a visited network having an automatic roaming agreement with the home network.

The system of the present invention includes means within each visited network for identifying the home network of each visiting subscriber and means within each visited network for determining whether or not the home network of each visiting subscriber has an automatic roaming agreement with the visited network. The system also includes means within each visited network for classifying as an automatic visitor each visiting subscriber whose home network has an automatic roaming agreement with the visited network, and means within each visited network for classifying as a manual visitor each visiting subscriber whose home network does not have an automatic roaming agreement with the visited network. Further, the system includes means within each visited network for maintaining a database of information on manual visitors, and means for storing in the database, registration information regarding each manual visitor. The storing means stores the registration information upon each manual visitor's initial call attempt in the visited network. Finally, the system includes means for accessing from each of the visited network's mobile switching centers, the database of registration information upon each call to be delivered to the manual visitor or each manual visitor's subsequent call attempts within the visited network.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

Figure 1:
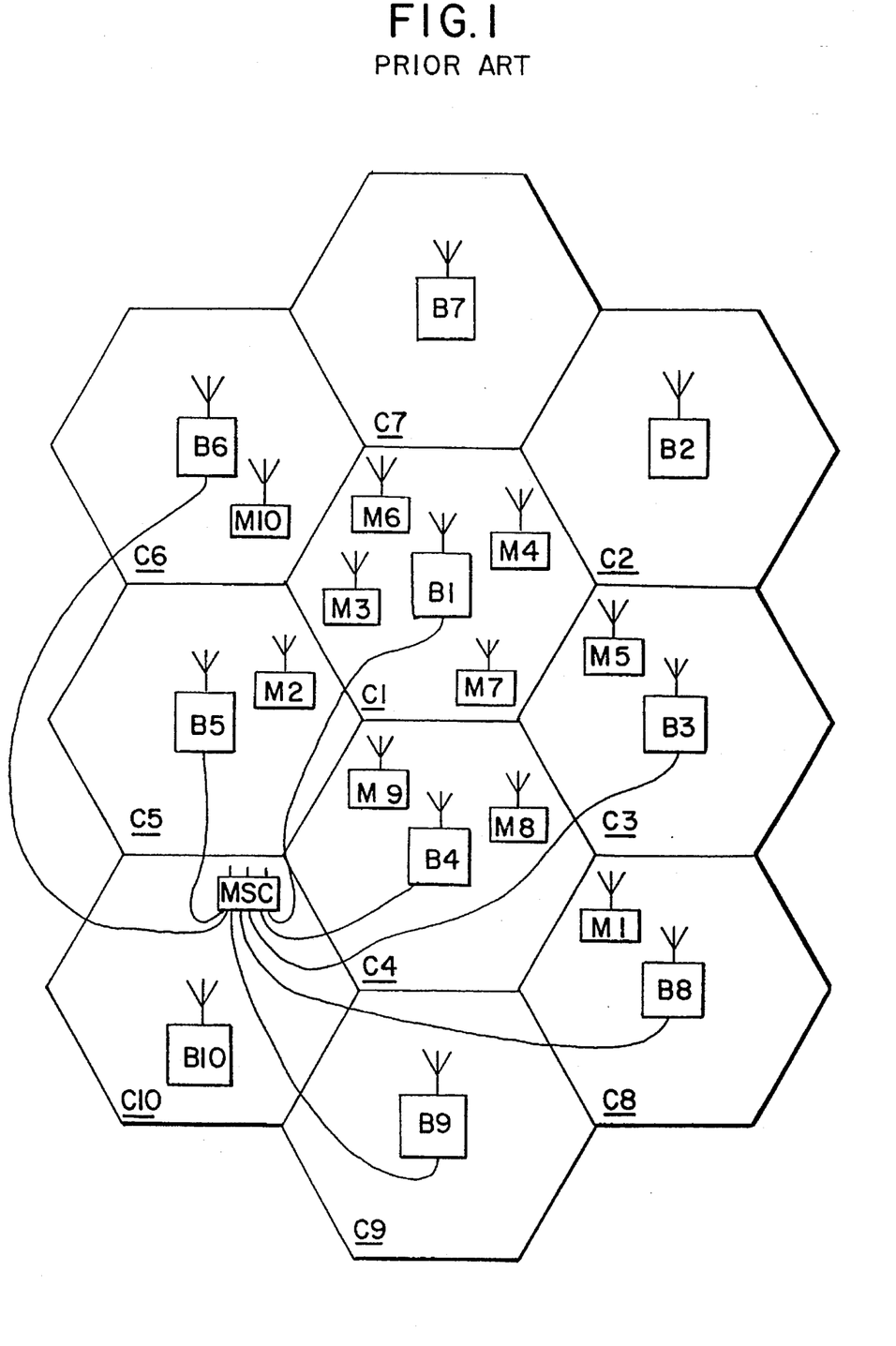
FIG. 1 (Prior Art) is an illustrative representation of a conventional cellular radio communications network of the type to which the present invention generally pertains.

Referring first to FIG. 1, there is illustrated a conventional cellular radio communications system of the type to which the present invention generally pertains. In FIG. 1, an arbitrary geographic area may be divided into a plurality of contiguous radio coverage areas, or cells C1–C10. While the system of FIG. 1 is illustratively shown to include only 10 cells, it should be clearly understood that in practice, the number of cells will be much larger.

Associated with and located within each of the cells C1–C10 is a base station designated as a corresponding one of a plurality of base stations B1–B10. Each one of the base stations B1–B10 includes a transmitter, a receiver, and base station controller as are well known in the art. In FIG. 1, the base stations B1–B10 are illustratively located at the center of each of the cells C1–C10, respectively, and are equipped with omni-directional antennas. However, in other configurations of a cellular radio system, the base stations B1–B10 may be located near the periphery, or otherwise away from the centers of the cells C1–C10 and may illuminate the cells C1–C10 with radio signals either omni-directionally or directionally. Therefore, the representation of the cellular radio system of FIG. 1 is for purposes of illustration only and is not intended as a limitation on the possible implementations of the cellular radio system within which the method and system of the present invention may be implemented.

With continuing reference to FIG. 1, a plurality of mobile stations M1–M10 may be found within the cells C1–C10. Again, only 10 mobile stations are shown in FIG. 1 but it should be understood that the actual number of mobile stations will be much larger in practice and will invariably greatly exceed the number of base stations. Moreover, while none of the mobile stations M1–M10 may be found in some of the cells C1–C10, the presence or absence of the mobile stations M1–M10 in any particular one of the cells C1–C10 should be understood to depend, in practice on the individual desires of the subscribers associated with mobile stations M1–M10 who may roam from one location in the cell to another or from one cell to an adjacent cell or neighboring cell, and even from one cellular radio exchange served by a mobile switching center to another such exchange.

Each of the mobile stations M1–M10 is capable of initiating or receiving a telephone call through one or more of the base stations B1–B10 and an associated mobile switching center (MSC). The MSC is connected by communication links, e.g., cables, to each of the illustrative base stations B1–B10 and to a fixed public switched telephone network (PSTN) (not shown) or a similar fixed network which may include an integrated system digital network (ISDN) facility.

Within the geographic coverage area served by a specific cellular communication network, there may be one MSC, or there may be several MSCs which are interconnected and connected to the PSTN or ISDN. The network may also include a home location register (HLR) which maintains a database of subscriber information. The relevant connections between the MSCs, and between the MSCs and the HLR, PSTN, or ISDN, are not completely shown in FIG. 1 but are well known to those of ordinary skill in the art.

There are generally two types of mobile subscribers, automatic subscribers and manual subscribers. An automatic subscriber is one for which the network in which the subscriber is located automatically updates the location and registration of the subscriber as the subscriber moves from one MSC to another within the network. This automatic location and registration eliminates the requirement for the subscriber to register with the network whenever the subscriber moves from one MSC to another within the network. Subscribers within their home network are automatic subscribers. Additionally, operators of different networks having signaling links between them may enter into automatic roaming agreements that provide their respective subscribers with automatic subscriber status when operating within each other's networks, thereby providing subscribers with the capability to roam between each other's networks without loss of services.

Each network may include a home location register (HLR) which stores subscriber information in a database and enables automatic updating of location and registration information for home subscribers and automatic visitors from other networks having automatic roaming agreements with the home network. When a subscriber enters a visited network that has an agreement with the subscriber's home network, and turns on his phone, the interface between the phone and the network recognizes the subscriber as being from a network having an automatic roaming agreement. The visited network makes a record of the subscriber in the MSC where the visiting subscriber is located and notifies the home network to update the location of the subscriber in the home network's database (HLR). Thereafter, calls directed to the subscriber in the home network are automatically forwarded to the visited network.

Figure 2:
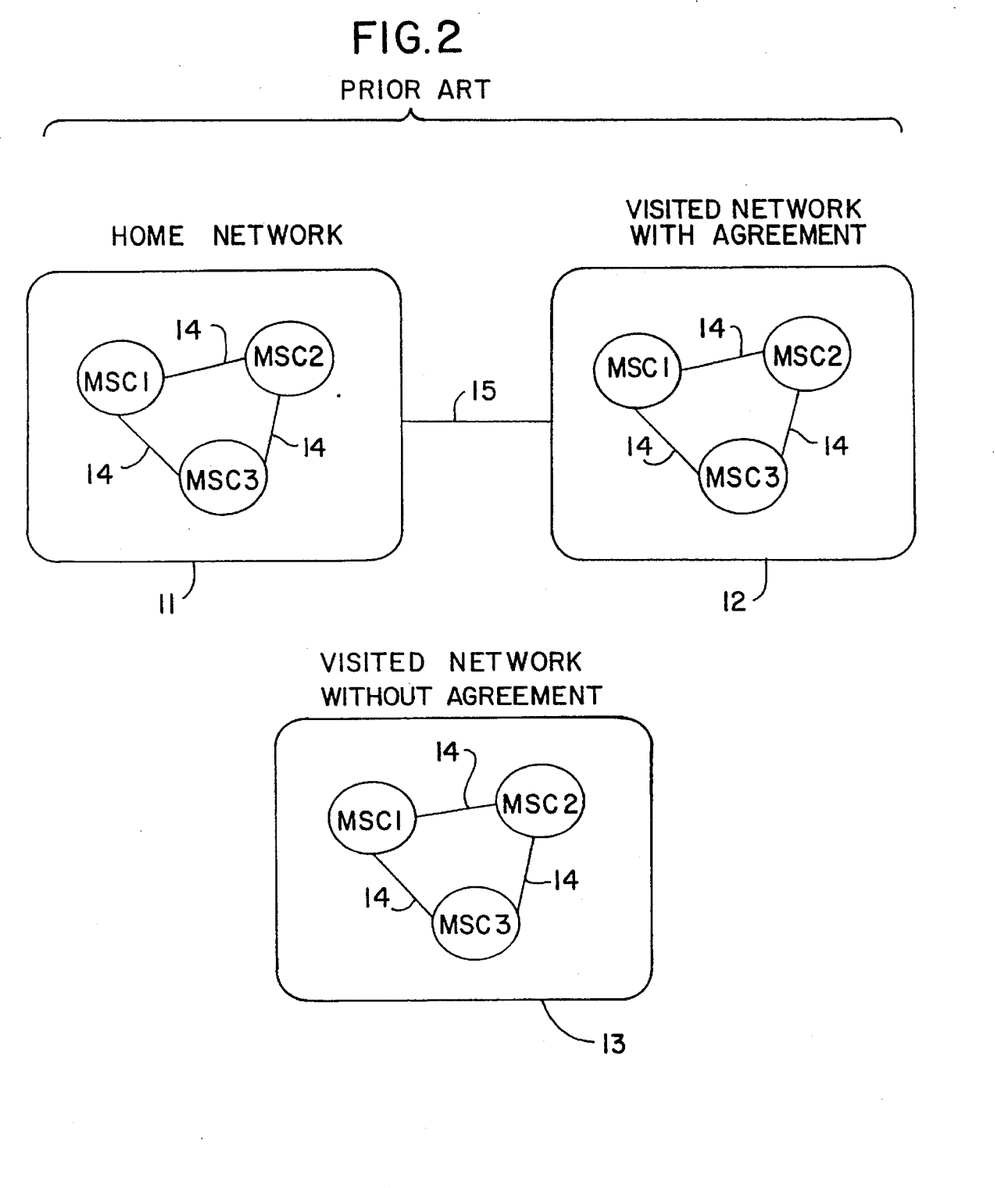
FIG. 2 (Prior Art) is an illustrative representation of three cellular radio communications networks of the type illustrated in FIG. 1, with a first network being a subscriber's home network, a second network being a visited network having an automatic roaming agreement with the home network, and a third network being a visited network that does not have an automatic roaming agreement with the home network.

FIG. 2 is an illustrative representation of three cellular radio communications networks with a first network 11 being a subscriber's home network, a second network 12 being a visited network having an automatic roaming agreement with the home network, and a third network 13 being a visited network that does not have an automatic roaming agreement with the home network. While the networks of FIG. 2 are illustratively shown to each include three MSCs interconnected by signaling links 14, it should be clearly understood that in practice, the number of MSCs may vary and still fall within the scope and spirit of the present invention.

The home network 11 provides automatic subscriber status to all mobile subscribers subscribing to its service. Thus, a home subscriber may roam freely from MSC1 to MSC2 and MSC3 within the home network 11 without having to re-register with the home network. A signaling link 15 between the home network 11 and the visited network 12 indicates that there is an automatic roaming agreement between the home network 11 and the visited network 12 for the visited network to treat visiting subscribers from the home network as automatic subscribers. Thus, roaming subscribers from the home network 11 may roam freely between MSCs 1, 2, and 3 in the visited network 12 having the agreement.

A metropolitan network is any group of automatic roaming cooperating MSCs sharing the cellular coverage of a certain geographic area, typically a city. A function identified as Local Access to Automatic Visitors allows incoming calls through a roamer port to be delivered to automatic visitors within the roamer port area in the metropolitan network.

Upon reception of an incoming call through a local access roamer port, a second dial tone is generated toward the calling subscriber. The calling subscriber then dials the called mobile subscriber's 10-digit directory number (including area code), and if the call is intended for an automatic visitor, the home system is interrogated to provide the roaming routing number corresponding to the subscriber's location. If the received roaming routing number belongs to the corresponding roamer area in the metropolitan network, the call is routed to the appropriate MSC within the metropolitan network. Otherwise, the call is rerouted according to the exchange data, e.g. the calling party is informed that the mobile subscriber cannot be reached.

A manual subscriber is one for which the network in which the subscriber is operating does not automatically update the location and registration of the subscriber as the subscriber roams from one MSC to another within the network. Such a situation arises when, as illustrated in FIG. 2, a subscriber from the home network 11 travels to the visited network 13 which does not have an automatic roaming agreement with the home network to provide automatic subscriber service. Manual subscribers must re-register with the visited network 13 whenever they roam from one MSC to another within the visited network. In addition, to help prevent fraud, many visited networks require such manual visitors to re-register before making each call, even if they have not roamed from a MSC in which they previously registered. Such per-call registration may be handled by a human operator or a mechanical operator with, for example, recorded voice instructions. Registration may include validation of credit card numbers or other means of making payment for cellular telephone services by accessing a database of bad credit card numbers.

Clearinghouse roamer validation is an on-line service used to prevent fraudulent manual visitors from being served by telecommunication systems. Clearinghouse roamer validation is provided by interacting between the MSC and an external database administered by the clearinghouse. The access to the clearinghouse can be made at the first call attempt to or from a manual roaming visitor and may be repeated at each subsequent call attempt. The clearinghouse validation check is performed in parallel with call setup.

At call access, a visiting mobile station transmits its mobile identification number (MIN) and electronic serial number (ESN). The MSC transmits the MIN and ESN to the clearinghouse via an I/O device which may be, for example, a V24 port. The clearinghouse checks the mobile station's MIN and ESN against a database of fraudulent MINs and ESNs. If the clearinghouse validates the visitor, no information is sent back to the MSC. If the clearinghouse determines that the visitor is not to be allowed service, the visitor's ESN is sent back to the MSC. The ESN is entered into the MSC's serial number barring list, and the visitor's service is disconnected. If the visitor has a call in progress, the call is immediately terminated.

It is possible for new visitors to arrive and initiate calls at a greater rate than the clearinghouse can accept for a prolonged period of time. When such an overload situation occurs, an alarm is issued when a buffer holding visitor data waiting to be validated is full. The alarm is cancelled when the number of available records in the buffer falls below a predetermined alarm cease level. The alarm levels are specified in terms of percent of the buffer by means of application dependent parameters. Application dependent parameters may include a parameter that indicates whether the clearinghouse check is to be performed for unidentified (home exchange unknown) subscribers. An additional parameter indicates whether the clearinghouse check is to be performed only for a subscriber's first call access or for every call access.

Figure 3:
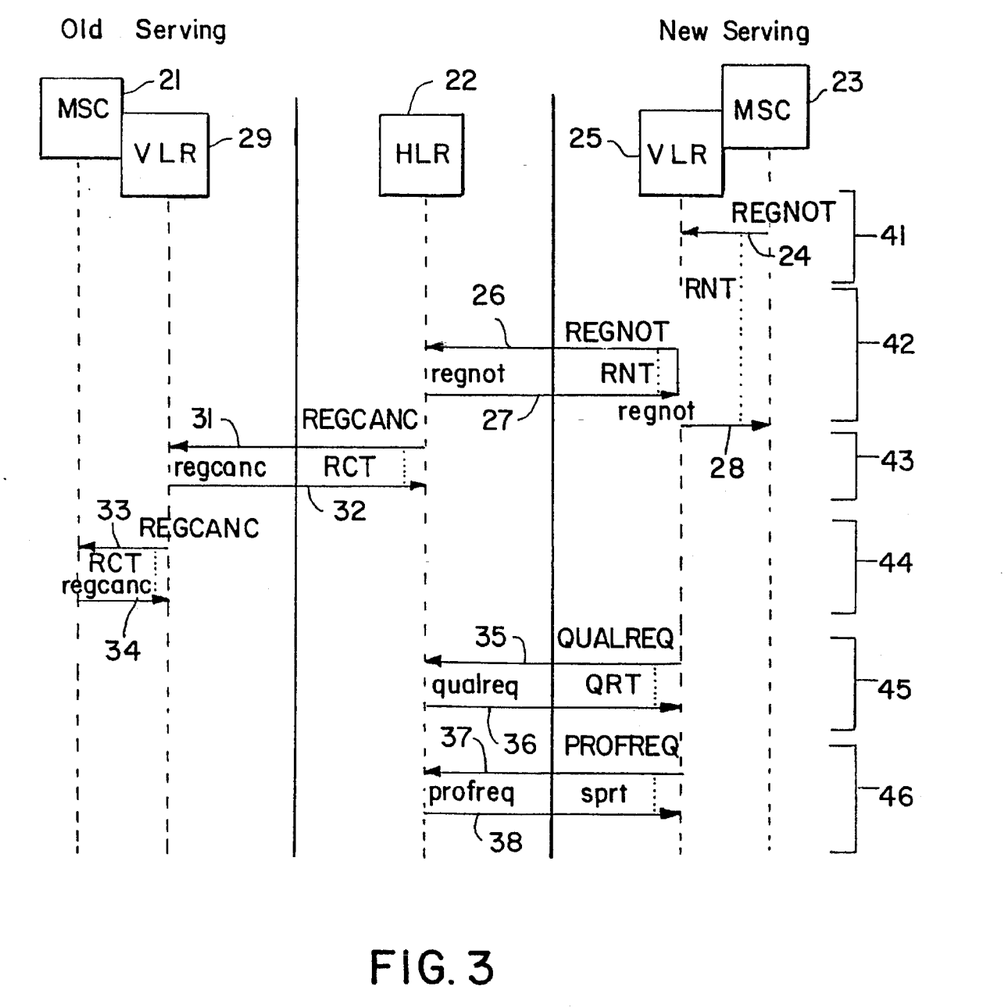
FIG. 3 is a signaling diagram illustrating the flow of messages between an old serving MSC, a HLR, and a new serving MSC during the registration and validation process as a mobile subscriber roams from the old serving MSC to the new serving MSC.

FIG. 3 is a signaling diagram illustrating the flow of messages between an old serving MSC 21, a HLR 22, and a new serving MSC 23 during the registration and validation process as a mobile subscriber roams from the old serving MSC 21 to the new serving MSC 23. After determining at step 41 that a roaming mobile is now within its service area, the new serving MSC 23 sends a REGNOT (Registration Notification) INVOKE message 24 to the new serving VLR 25. The new serving MSC 23 may detect the mobile subscriber's presence through autonomous registration, call origination, or service order.

If the mobile subscriber had previously registered with an MSC within the network served by the new serving VLR 25, the VLR 25 may take no further action other than to record the identity of the MSC 23 currently serving the mobile.

If the mobile is unknown to the new serving VLR 25, or if the information requested by the new serving MSC 23 is not available at the VLR, the new serving VLR 25 sends a REGNOT INVOKE message 26 at step 42 to the HLR 22 associated with the mobile subscriber. This association is made through the mobile identification number (MIN) reported by the subscriber's mobile station. A REGNOT response message 27 is sent from the HLR 22 to the new serving VLR 25. An additional REGNOT response message 28 is sent from the new serving VLR 25 to the new serving MSC 23, and may be contingent upon the response 27 received from the HLR 22.

If the mobile subscriber was previously registered in an old serving VLR 29 and MSC 21, the HLR 22 sends at step 43 a REGCANC (Registration Cancellation) INVOKE message 31 to the old serving VLR 29. The old serving VLR 29, upon receipt of the cancellation message 31, removes all record of the mobile subscriber from its memory, and a REGCANC response message 32 is returned to the HLR 22. The REGCANC INVOKE message 31 may be sent by the HLR 22 at any time after it receives the REGNOT INVOKE message 26.

At step 44, the old serving VLR 29 sends a REGCANC INVOKE message 33 to the old serving MSC 21. The old serving MSC 21, upon receipt of the cancellation message 33, removes all record of the mobile station from its memory, and returns a REGCANC response message 34 to the old serving VLR 29.

At step 45, the new serving VLR 25 creates an entry for the mobile in its internal data structures and may send a QUALREQ (Qualification Request) INVOKE message 35 to the HLR 22 in order to authenticate the mobile subscriber and determine validation requirements as indicated in a QUALREQ response message 36. If required, the new serving VLR 25 may then s end a PROFREQ (Service Profile Request) INVOKE message 37 to the HLR 22 at step 46 in order to obtain the service profile for the roaming mobile subscriber, as indicated in a PROFREQ response message 38.

In the example illustrated in FIG. 3, the Registration Notification 26, Qualification Request 35, and Service Profile Request 37 are shown as separate primitive transactions for clarity. Options are provided in the IS-41 message set to group these primitives into a single transaction if desired.

Delivery of calls to manual roamers also poses an problem in existing telecommunications networks. If a subscriber roams from the home network to the visited network without agreement, the subscriber must register with the visited network before he can initiate or receive telephone calls. Otherwise, the subscriber will get a "no service" message on his mobile station. Once the subscriber has registered with the visited network, the operator of the visited network informs the home network that the subscriber is now located in the visited network and provides an access telephone number for the visited network. The access number is often referred to as a pilot number or, preferably, a roamer port number (RPN).

Subsequently, if someone calls the subscriber at the subscriber's telephone number in his home network, the calling party will hear a message that the subscriber is now in the visited network, and providing the RPN. If the calling party dials the RPN, he obtains a dial tone for the visited network. The calling party then dials the subscriber's regular 10-digit directory number (including the 3-digit area code) in order to complete the call.

An additional problem arises most often in metropolitan areas when the visited network without agreement comprises more than one MSC. There can be only one RPN for the visited network because the RPN is connected through the Public Switched Telephone Network (PSTN) to the home network. The visited network is then a single roamer port area which includes multiple MSCs. Thus, the RPN provides a port into the visited network, but does not identify to the home network a particular MSC within the visited network in which the subscriber may be found.

Existing telecommunication systems have solved this problem either by providing a separate RPN for each MSC in the network, or with a technique called sequential paging of manual visitors. In sequential paging, a calling party dials the RPN, obtains a dial tone from the visited network, and dial s the subscriber's telephone number as usual. However, the visited network does not know which MSC the subscriber is in. Therefore, the call is initially routed to an entry MSC which may be, for example MSC1. The network pages for the subscriber in MSC1, and if there is a page response, the call is completed. If the subscriber is not found, the call is routed via a trunk to the next MSC along a routing path which may be, for example, MSC2. The network then pages for the subscriber in MSC2, and if there is a page response, the call is completed. If the subscriber is not found, the call is routed via a trunk to additional MSCs until the last MSC in the network is paged. If there is still no response, an action defined by the MSC data is performed. For example, the calling party may be informed that the mobile station cannot be reached. Sequential paging ties up trunk resources and can take a considerable period of time to complete the call, depending on the number of MSCs which must be paged before the subscriber is found.

Figure 4:
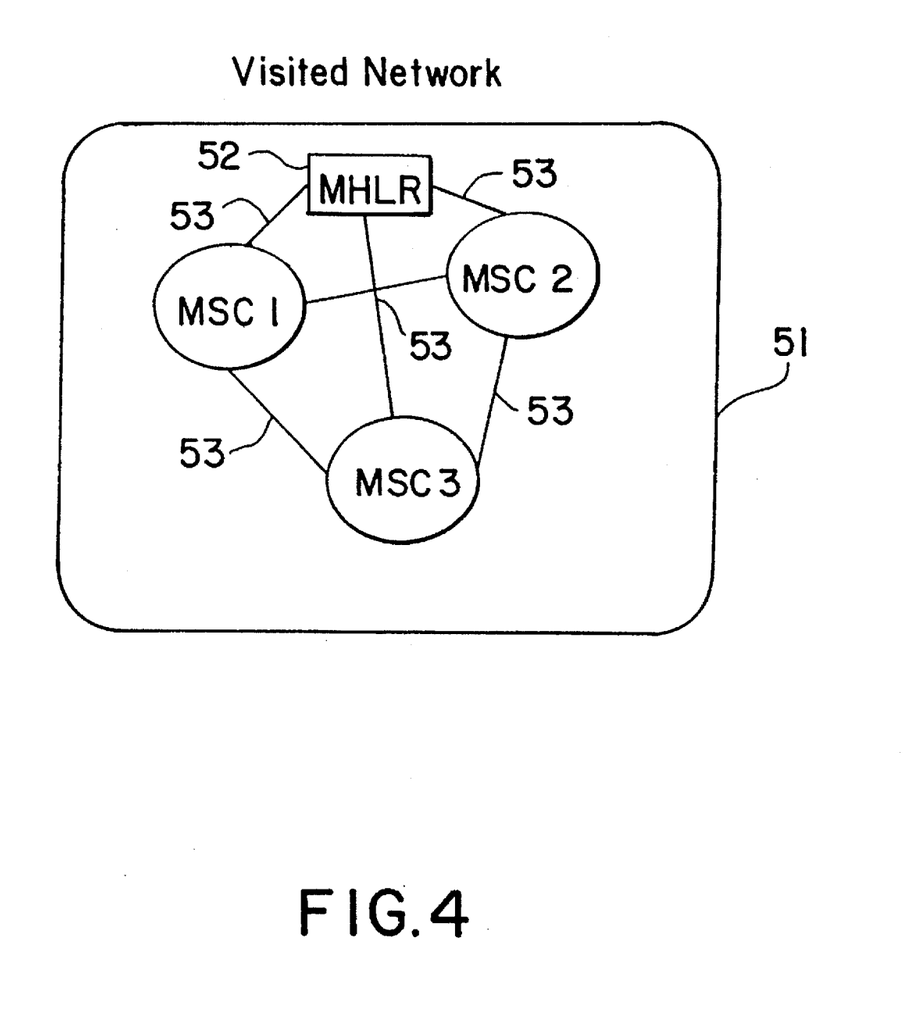
FIG. 4 is an illustrative representation of a visited cellular radio communications network that does not have an automatic roaming agreement with the home network and has been implemented with a manual home location register of the present invention.

FIG. 4 is an illustrative representation of a visited cellular radio communications network 51 that does not have an automatic roaming agreement with the home network and has been implemented with a manual home location register (M-HLR) 52 of the present invention. The present invention solves many of the problems associated with registration of manual visitors and call delivery to manual visitors by providing a means for treating manual visitors as automatic visitors. The M-HLR 52 includes a database for manual visitors, and is implemented within the network 51 and connected to MSC1, MSC2, and MSC3. The M-HLR 52 may be a standalone node, may be co-located with any MSC in the network, or may be co-located with a HLR, if applicable. If implemented as a standalone node, the M-HLR 52 has its own standalone processor to perform database and control functions. If co-located with a MSC or HLR, the M-HLR 52 may share a processor while accessing its manual visitor database.

Data on each manual visitor is maintained in the M-HLR 52 instead of the MSC where the manual visitor initiates an access. This data is then shared between the multiple MSCs by means of the network's automatic visitor signaling links 53 so that manual visitors do not need to re-register when they roam from one MSC to another MSC within the visited network 51.

The first time a manual visitor makes a call in the visited network from, for example, MSC1, the registration/validation procedures are unchanged from the existing procedures as illustrated in FIG. 3. However, the registration is recorded in the M-HLR 52, instead of MSC1 in which the manual visitor is located. The manual visitor can then move freely around the visited network 51 without having to re-register in each MSC. Cancellations of subscriber records in the M-HLR 52 are based on activity supervision, as is currently performed in existing systems. Maintenance of manual visitor records in the M-HLR 52 has the additional benefit of increasing the subscriber capacity of the MSC's in the visited network 51. All of the MSC's available records may be reserved for automatic visitors since there is no need to reserve any records for manual visitors.

The present invention also improves the process of call delivery to manual visitors. Instead of using sequential paging, which can tie up valuable trunk resources for extended periods of time, call delivery is handled with Local Access function, as it is for an automatic visitor. Calls to a manual visitor from other networks are delivered to a roamer port number (RPN) where a second dial tone is generated toward the calling subscriber. The calling subscriber then dials the called mobile subscriber's 10-digit directory number, which includes the 3-digit area code. Thereafter, the call delivery process follows the message flow illustrated in FIG. 5.

Figure 5:
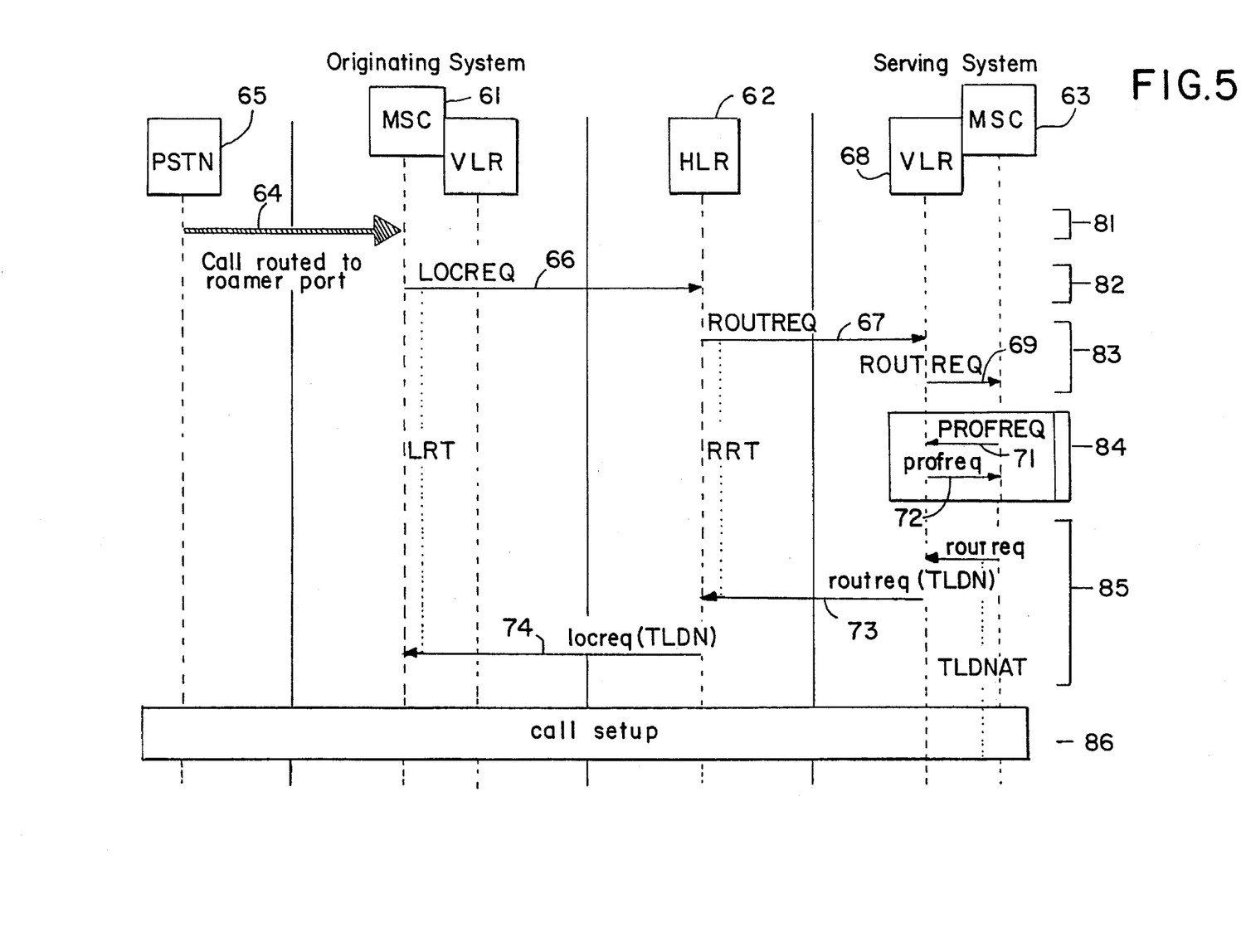
FIG. 5 is a signaling diagram illustrating the flow of messages between an originating MSC, a HLR, and a serving MSC during call delivery to a mobile subscriber that is outside the serving area of the MSC where the call originates.

FIG. 5 is a signaling diagram illustrating the flow of messages between an originating MSC 61, a HLR 62, and a serving MSC 63 during call delivery to a mobile subscriber that is outside the serving area of the MSC 61 where the call originates. MSCs in the functional model described in IS-41.1 contain switching functions only and must interact with their associated HLR and VLR in order to obtain database information for a mobile station. In real applications, the HLR and VLR functions may be integrated within the MSC.

At step 81, a call to be routed to a roamer port access is received from the public switched telephone number (PSTN), and a second dial tone i s generated toward the calling subscriber. The calling subscriber then dials the called subscriber's 10-digit directory number. At step 82, the originating MSC 61 sends a LOCREQ (Location Request) INVOKE message 66 to the HLR 62 associated with the mobile station. This association is made through the dialed mobile address digits.

At step 83, if the dialed mobile address digits are assigned to a legitimate subscriber, and if call forward unconditional is not in effect (as defined by the service profile) the HLR 62 sends a ROUTREQ (Routing Request) INVOKE message 67 to the VLR 68 that last provided a registration notification. This serving VLR 68 then forwards a ROUTREQ INVOKE message 69 to the current serving MSC 63. The mobile station may have roamed within the network served by the serving VLR 68 and reported its new location to the serving VLR 68 via the serving MSC 63. The serving VLR 68 may not have reported this change in location to the HLR 62.

In response to the ROUTREQ INVOKE message 69, the serving MSC 63 consults its internal data structures to determine if the mobile station is already engaged in a call on this MSC. In the example illustrated in FIG. 5, the mobile station is idle, and it is assumed that the mobile station is not known to the serving MSC 63. The serving MSC 63 may then obtain the service profile of the mobile subscriber at step 84 by sending a PROFREQ INVOKE message 71 to the serving VLR 68. The service profile is returned in a PROFREQ response message 72. Step 84 may be eliminated if the service profile is obtained by the serving MSC 63 prior to the termination attempt (e.g. when the mobile registers).

At step 85, if the mobile station is located in the roamer port area, then the serving exchange MSC 63 allocates a temporary local directory number (TLDN) and returns this information to the HLR 62 in a ROUTREQ response message 73. Otherwise, if the mobile station was located outside the roamer port area, then the call is terminated according to the exchange data. When the ROUTREQ response message 73 is received by the HLR 62, the HLR constructs a LOCREQ response message 74 by adding the mobile identification number (MIN) and electronic serial number (ESN) of the mobile to the information provided by the serving MSC 63. The HLR 62 then returns the LOCREQ response message 74 to the originating MSC 61. At call setup at step 86, the originating MSC 61 establishes a voice path to the serving MSC 63 using existing interconnection protocols and the TLDN specified in the LOCREQ response message 74.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. In a cellular telecommunication system in which mobile subscribers may roam from a home network to a visited network having an automatic roaming agreement with said home network, and to a visited network without an automatic roaming agreement with said home network, a system for providing visiting subscribers to said visited network without said automatic roaming agreement with the same registration capabilities as visiting subscribers to said visited network having an automatic roaming agreement with said home network, said system comprising:

means within each visited network for identifying the home network of each visiting subscriber;

means within each visited network for determining whether or not the home network of each visiting subscriber has an automatic roaming agreement with the visited network;

means within each visited network for classifying as an automatic visitor each visiting subscriber whose home network has an automatic roaming agreement with the visited network;

means within each visited network for classifying as a manual visitor each visiting subscriber whose home network does not have an automatic roaming agreement with the visited network;

means within each visited network for maintaining a database of information on manual visitors;

means for storing in said database, registration information regarding each manual visitor, said storing means storing said registration information upon each manual visitor's initial call attempt in said visited network; and means for accessing from each of said visited network's mobile switching centers, said database of registration information upon each manual visitor's subsequent call attempts within said visited network.

2. The system of claim 1 wherein said means within each visited network for identifying the home network of each visiting subscriber includes means for identifying the home network by reading each subscriber's mobile identification number.

3. The system of claim 2 wherein said means within each visited network for maintaining a database of information on manual visitors includes a manual home location register.

4. The system of claim 3 wherein said manual home location register is a standalone node.

5. The system of claim 3 wherein said manual home location register is co-located with a mobile switching center.

6. The system of claim 3 wherein said manual home location register is co-located with a home location register.

7. In a cellular telecommunication system in which mobile subscribers may roam from a home network to a visited network having an automatic roaming agreement with said home network, and to a visited network without an automatic roaming agreement with said home network, a method of providing visiting subscribers to said visited network without said automatic roaming agreement with the same registration capabilities as visiting subscribers to said visited network having an automatic roaming agreement with said home network, said method comprising the steps of:

identifying the home network of each visiting subscriber within each visited network;

determining whether or not the home network of each visiting subscriber has an automatic roaming agreement with the visited network;

classifying as an automatic visitor each visiting subscriber whose home network is determined to have an automatic roaming agreement with the visited network;

classifying as a manual visitor each visiting subscriber whose home network is determined not to have an automatic roaming agreement with the visited network;

maintaining, within each visited network, a database of information on manual visitors;

storing, in said database, registration information regarding each manual visitor upon each manual visitor's initial call attempt in said visited network; and accessing, from each of said visited network's mobile switching centers, said database of registration information upon each call to be delivered to the manual visitor and upon each manual visitor's subsequent call attempts within said visited network.

8. The method of claim 7 wherein said step of identifying the home network of each visiting subscriber within each visited network includes identifying the home network by reading each subscriber's mobile identification number.

9. The method of claim 8 wherein said step of maintaining a database of information on manual visitors includes maintaining said database in a manual home location register.

10. The method of claim 9 wherein said step of maintaining said database in a manual home location register includes maintaining said database in a manual home location register which is a standalone node.

11. The method of claim 9 wherein said step of maintaining said database in a manual home location register includes maintaining said database in a manual home location register which is co-located with a mobile switching center.

12. The method of claim 9 wherein said step of maintaining said database in a manual home location register includes maintaining said database in a manual home location register which is co-located with a home location register.

\* \* \* \* \*